United States Patent
Bang et al.

(10) Patent No.: US 10,393,947 B2
(45) Date of Patent: Aug. 27, 2019

(54) BACKLIGHT UNIT, DISPLAY DEVICE AND METHOD OF FABRICATING THE SAME

(71) Applicant: Samsung Display Co., Ltd., Yongin-Si, Gyeonggi-Do (KR)

(72) Inventors: Jungsuk Bang, Seoul (KR); Hyunyoung Jung, Hwaseong-si (KR); Kwangsoo Bae, Suwon-si (KR); Minjeong Oh, Gimpo-si (KR); Haeju Yun, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 190 days.

(21) Appl. No.: 15/678,210

(22) Filed: Aug. 16, 2017

(65) Prior Publication Data

US 2018/0067249 A1    Mar. 8, 2018

(30) Foreign Application Priority Data

Sep. 2, 2016    (KR) .................. 10-2016-0113447

(51) Int. Cl.
| | | |
|---|---|---|
| *F21V 8/00* | (2006.01) | |
| *G02F 1/1345* | (2006.01) | |
| *G02F 1/1362* | (2006.01) | |

(52) U.S. Cl.
CPC ......... *G02B 6/0055* (2013.01); *G02B 6/0065* (2013.01); *G02F 1/13452* (2013.01); *G02F 1/136286* (2013.01)

(58) Field of Classification Search
CPC . G02B 6/0055; G02B 6/0065; G02F 1/13452; G02F 1/136286
See application file for complete search history.

(56) References Cited

U.S. PATENT DOCUMENTS

| | | | | |
|---|---|---|---|---|
| 6,657,683 | B2* | 12/2003 | Richard | G02B 6/0053 349/63 |
| 2001/0012158 | A1* | 8/2001 | Umemoto | G02B 1/10 359/599 |
| 2004/0228112 | A1* | 11/2004 | Takata | G02B 6/0036 362/601 |
| 2013/0100144 | A1* | 4/2013 | Rao | G02B 6/0038 345/501 |
| 2014/0146563 | A1* | 5/2014 | Watanabe | G02B 6/0043 362/606 |
| 2016/0077328 | A1 | 3/2016 | Chong et al. | |
| 2016/0299279 | A1* | 10/2016 | Uehara | G02B 6/0055 |
| 2018/0011235 | A1 | 1/2018 | Bae et al. | |
| 2018/0039017 | A1 | 2/2018 | Bang et al. | |

FOREIGN PATENT DOCUMENTS

| | | |
|---|---|---|
| JP | 2010251201 A | 11/2010 |
| KR | 100861982 B1 | 9/2008 |
| KR | 1020120023450 A | 3/2012 |
| KR | 101331907 B1 | 11/2013 |
| KR | 101580992 B1 | 12/2015 |

* cited by examiner

*Primary Examiner* — Robert J May
*Assistant Examiner* — Leah Simone Macchiarolo
(74) *Attorney, Agent, or Firm* — Cantor Colburn LLP (57) ABSTRACT

A display device includes a display panel, and a backlight unit including a light guide plate which guides light in an upward direction toward the display panel and including a transmission region and a reflection region; a supporting pattern at the reflection region; a reflection layer on upper and side surfaces of the supporting pattern; and an insulating layer which covers the transmission region and the reflection layer at the reflection region.

20 Claims, 10 Drawing Sheets

BACKLIGHT UNIT, DISPLAY DEVICE AND METHOD OF FABRICATING THE SAME

This application claims priority to Korean Patent Application No. 10-2016-0113447, filed on Sep. 2, 2016, and all the benefits accruing therefrom under 35 U.S.C. § 119, the content of which in its entirety is herein incorporated by reference.

BACKGROUND

(1) Field

The present disclosure relates to a thin display device with high light-emitting efficiency and a method of fabricating the same.

(2) Description of the Related Art

In general, a display device includes a display panel which is used to display an image using light, and a backlight unit which is used to generate the light and provide the light to the display panel. The display panel includes a first substrate with a plurality of pixels, a second substrate provided to face the first substrate, and an image display layer between the first and second substrates. In the case of an edge-type backlight unit, the backlight unit is disposed to face a side surface of the display device.

Transmittance of the light provided from the backlight unit to the display panel is controlled by the image display layer which is driven by the pixels of the display panel, and the control of the image display layer is exploited to display an image. A liquid crystal layer, an electrowetting layer, or an electrophoresis layer may be used as the image display layer.

The edge-type backlight unit includes a light source for generating light, a light guide plate which is used to guide the light provided from the light source toward the display panel or in an upward direction, and an optical sheet which is provided between the light guide plate and the display panel and is used to transmit the light from the light guide plate to the display panel or in the upward direction.

SUMMARY

One or more embodiment of the invention provides an optical structure of a display device, which is configured to have relatively high light-emitting efficiency and a relatively small overall thickness, and a method of fabricating the same.

According to an embodiment of the invention, a display device includes a display panel configured to display an image using light, and a backlight unit configured to provide the light to the display panel. The backlight unit may include a light source which generates the light, a light guide plate which guides the light in an upward direction toward the display panel and the light guide plate including a transmission region and a reflection region; a supporting pattern on a light exit surface of the light guide plate at the reflection region thereof, the supporting pattern including an upper surface facing the display panel, a lower surface facing the light exit surface of the light guide plate, and a side surface which connects the upper and lower surfaces to each other; a reflection layer provided on the upper and side surfaces of the supporting pattern at the reflection region of the light guide plate; and an insulating layer which covers the transmission region of the light guide plate and the reflection layer at the reflection region of the light guide plate.

In some embodiments, the supporting pattern and the insulating layer may each include an organic material.

In some embodiments, the reflection layer may include a metallic material configured to reflect the light.

In some embodiments, the insulating layer may have a refractive index that is equal to that of the light guide plate.

In some embodiments, the insulating layer, the supporting pattern and the light guide plate may have the same refractive index.

In some embodiments, the supporting pattern may be provided as a plurality of discrete supporting patterns spaced apart from each other on the light exit surface of the light guide plate, such plurality of discrete supporting patterns defining a plurality of discrete reflection regions of the light guide plate which are spaced apart from each other in a top plan view.

In some embodiments, the supporting patterns may be provided as a unitary supporting pattern including a plurality of side surfaces thereof spaced apart from each other, such side surfaces defining a plurality of discrete transmission regions of the light guide plate which are spaced apart from each other in a top plan view.

In some embodiments, the supporting pattern may have a cylindrical shape, a diameter of the cylindrical shape supporting pattern may decrease in a direction from the lower surface to the upper surface thereof, and a cross section of the cylindrical shape supporting pattern may have a trapezoidal shape In some embodiments, the side surface of the supporting pattern and the reflection layer thereon may be inclined at an angle of 55° to 80° relative to the light exit surface of the light guide plate.

In some embodiments, the side surface of the supporting pattern and the reflection layer thereon may be inclined at an angle of 70° relative to the light exit surface of the light guide plate.

In some embodiments, a distance between the lower surface of the supporting pattern and an upper surface of the insulating layer range from about 3.5 micrometers (µm) to about 10 µm.

According to an embodiment of the invention, a method of fabricating a display device may include: preparing a light guide plate through which the light is guided to be emitted through a light exit surface of the light guide plate in the upward direction toward a display panel and the light guide plate including a transmission region and a reflection region; forming a supporting pattern on a light exit surface of the light guide plate at the reflection region thereof, the supporting pattern including: an upper surface facing the display panel, a lower surface facing the light exit surface of the light guide plate, and a side surface which connects the upper and lower surfaces to each other; forming a metal material layer on the supporting pattern at the reflection region and on the light exit surface of the light guide plate at the transmission region thereof; etching the metal material layer to remove a portion of the metal material layer at the transmission region and to maintain a portion of the metal material layer on the upper and side surfaces of the supporting pattern at the reflection region, the portion of the metal material layer maintained on the upper and side surfaces forming a reflection layer on the supporting pattern; and forming an insulating layer on the light guide plate to cover the light transmission region of the light guide plate and to cover the reflection layer at the reflection region of the light guide plate.

According to an embodiment of the invention, a backlight unit includes: a light guide plate which guides light in an upward direction toward a display panel of the display device; and an optical structure through which the light emitted from the light guide plate is transmitted to the display panel in the upward direction. The light guide plate includes: a transmission region at which the optical structure transmits the light emitted through the light exit surface to the display panel, and a reflection region at which the optical structure reflects the light emitted through the light exit surface to the light guide plate. The optical structure includes: a supporting pattern in contact with the light exit surface of the light guide plate at the reflection region thereof, the supporting pattern including an upper surface facing the display panel, a lower surface contacting the light exit surface of the light guide plate, and a side surface which connects the upper and lower surfaces to each other; a reflection layer provided on the upper and side surfaces of the supporting pattern at the reflection region of the light guide plate; and an insulating layer which covers the reflection layer at the reflection region of the light guide plate, such insulating layer in contact with the light exit surface of the light guide plate at the transmission region thereof.

BRIEF DESCRIPTION OF THE DRAWINGS

Exemplary embodiments will be more clearly understood from the following brief description taken in conjunction with the accompanying drawings. The accompanying drawings represent non-limiting, exemplary embodiments as described herein.

DETAILED DESCRIPTION

Exemplary embodiments of the invention will now be described more fully with reference to the accompanying drawings, in which exemplary embodiments are shown. Exemplary embodiments of the invention may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

It will be understood that, although the terms "first," "second," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the invention are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region.

An optical sheet of a display device or a backlight unit thereof may collectively include a diffusion sheet for diffusing the light, a prism sheet which is provided on the diffusion sheet to collimate the light passing therethrough, and a protection sheet which is provided on the prism sheet to protect the prism sheet. The optical sheet may collectively include a plurality of individual sheets and may have a total thickness of about 0.5 millimeter (mm). Owing to this structure of the overall optical sheet, reducing a thickness and optical loss of the display device including such optical sheet may be difficult.

Figure 1:
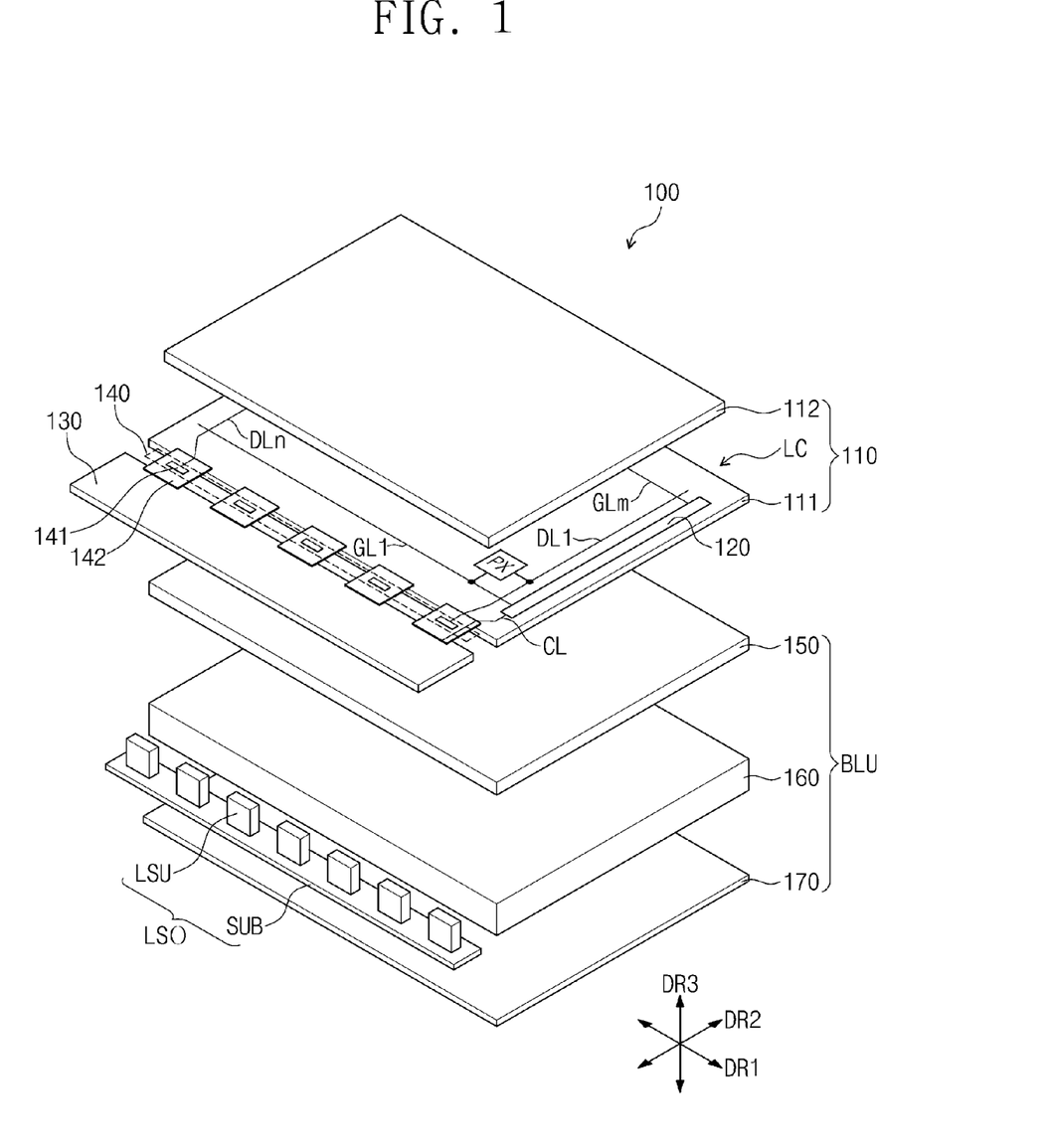
FIG. 1 is an exploded perspective view of an exemplary embodiment of a display device according to the invention.

FIG. 1 is an exploded perspective view of an exemplary embodiment of a display device according to the invention.

Referring to FIG. 1, a display device 100 may include a display panel 110, a gate driver 120, a printed circuit board 130, a data driver 140 and a backlight unit BLU. The display panel 110 may have a relatively long side which lengthwise extends in a first direction DR1, and a relatively short side which lengthwise extends in a second direction DR2 crossing the first direction DR1.

The backlight unit BLU may be configured to generate and condense light and to provide the light to the display panel 110. The display panel 110 may be configured to displayer an image using the light provided from the backlight unit BLU.

The display panel 110 may include a first substrate 111, a second substrate 112 facing the first substrate 111, and an image display layer which controls transmittance of light therethrough such as a liquid crystal layer LC between the first and second substrates 111 and 112. The first and second substrates 111 and 112 having disposed thereon respective layers thereof, may form a first display substrate and a second display substrate. A pixel PX provided in plurality, a plurality of gate lines GL1-GLm, and a plurality of data lines DL1-DLn may be provided on the first substrate 111, where 'm' and 'n' are natural numbers. Although, for convenience in description, one pixel PX is illustrated in FIG. 1, a plurality of the pixels PX may be provided on the first substrate 111. The pixels PX, the plurality of gate lines GL1-GLm and the plurality of data lines DL1-DLn are disposed in a display area of the display device to adjust orientations of materials within the image display layer to control the light transmitted therethrough and display an image. A non-display area may be disposed adjacent to the display area, such as surrounding the display area in the top plan view.

The gate lines GL1-GLm and the data lines DL1-DLn may be electrically disconnected (e.g., insulated) from each other and may be provided to cross each other in a top plan view. The gate lines GL1-GLm may have a relatively long dimension which lengthwise extends in the first direction DR1 and may be connected to the gate driver 120. The data lines DL1-DLn may have a relatively long dimension which lengthwise extends in the second direction DR2 and may be connected to the data driver 140.

In an exemplary embodiment, the pixels PX may be respectively provided in regions which are defined by the gate and data lines GL1-GLm and DL1-DLn crossing each other but the invention is not limited thereto. The pixels PX may be arranged in a matrix shape in the top plan view, and may be respectively connected to a gate line and a data line among the gate and data lines GL1-GLm and DL1-DLn. A pixel PX may include a switching element such as a transistor to selectively apply driving, control or power signals to the pixel PX for generating an image.

The gate driver 120 may be provided on a region of the first substrate 111, which is adjacent to a relatively long side of the first substrate 111, where the long side lengthwise in the first direction DR1. The gate driver 120 may be disposed in the non-display area. In an exemplary embodiment, portions or layers of the gate driver 120 in the non-display layer may be formed at the same time using the same process as that for portions or layers of the transistors of the pixels PX. The transistors may include a thin film transistor "TFT". In some embodiments, the gate driver 120 may be an amorphous silicon TFT gate ("ASG") driver circuit or an oxide silicon TFT gate ("OSG") driver circuit that is provided on the first substrate 111.

However, the invention is not limited thereto. In exemplary embodiments, for example, the gate driver 120 may include a plurality of driver chips that are mounted on a flexible printed circuit board and are connected to the first substrate 111 through the flexible printed circuit board. That is, the gate driver 120 may be connected to the first substrate 111 in a tape carrier package ("TCP") manner. In certain embodiments, the gate driver 120 may be one of a plurality of driver chips that are mounted on the first substrate 111 in a chip-on-glass ("COG") manner.

A timing controller (not shown) may be provided on the printed circuit board 130. The timing controller may be an integrated circuit chip which is mounted on the printed circuit board 130, and may be connected to the gate driver 120 and the data driver 140. The timing controller may output a gate control signal, a data control signal and image data.

The gate driver 120 may receive the gate control signal from the timing controller through a control line CL which connects the gate driver 120 and the timing controller to each other. The gate driver 120 may be configured to generate a plurality of gate signals in response to the gate control signal and sequentially output the gate signals. The gate signals may be provided to the pixels PX on a pixel row basis through the gate lines GL1-GLm. Accordingly, the pixels PX may be driven row by row.

The data driver 140 may include a source driving chip 141 provided in plurality. The source driving chips 141 may be mounted on a flexible circuit board 142 provided in plurality, respectively. Each of the flexible circuit boards 142 may be connected to a side region of the first substrate 111, which is off-centered in the second direction DR2 (e.g., near a long edge of the first substrate 111), and to the printed circuit board 130. In an exemplary embodiment, for example, the data driver 140 may be connected to the first substrate 111 and to the printed circuit board 130 in a tape carrier package ("TCP") manner. However, the invention is not limited thereto, and the source driving chips 141 of the data driver 140 may be mounted on the first substrate 111 in a chip-on-glass ("COG") manner.

The data driver 140 may be configured to receive the image data and/or the data control signal from the timing controller. The data driver 140 may be configured to generate analog data voltages which correspond to the image data, in response to the data control signal and then output the analog data voltages. The data voltages may be provided to the pixels PX through the data lines DL1-DLn.

The pixels PX may be configured to receive the data voltages through the data lines DL1-DLn, in response to the gate signals provided through the gate lines GL1-GLm. The pixels PX may display images with gradation levels corresponding to the data voltages.

The backlight unit BLU may be an edge-type backlight unit. The backlight unit BLU may include an optical structure 150, a light guide plate 160, a light source LSO and a reflection sheet 170. Each of the optical structure 150, the light guide plate 160 and the reflection sheet 170 may be provided to have a relatively long side lengthwise extended parallel to the first direction DR1 and a relatively short side lengthwise extended parallel to the second direction DR2.

The optical structure 150 may be provided below the display panel 110, the light guide plate 160 may be provided below the optical structure 150, and the reflection sheet 170 may be provided below the light guide plate 160. The light source LSO may define a long dimension thereof which lengthwise extends in the first direction DR1 and may be provided to be adjacent to a side surface of the light guide plate 160 in the second direction DR2.

The light guide plate 160 may include glass, but the invention is not limited thereto. In an exemplary embodiment, for example, the light guide plate 160 may include a plastic material (e.g., polymethylmethacrylate ("PMMA")). The side surface of the light guide plate 160 adjacent to the light source LSO in the second direction DR2 may be used as a light-incident surface of the light guide plate 160, and light generated in the light source LSO may be incident into the light guide plate 160 through the light-incident surface thereof. The light guide plate 160 may be configured to guide the light, which is incident from the light source LSO, toward the display panel 110 or in an upward direction. Here, the upward direction may be perpendicular to both of the first and second directions DR1 and DR2. The guided light may exit the light guide plate 160 through a light-exiting surface thereof which faces the optical structure 150, and a lower surface of the light guide plate 160 opposes the light-exiting surface. A side surface of the light guide plate 160 is provided in plurality to connect the light-exiting and lower surfaces to each other.

The light source LSO may include a light source substrate SUB of which a length thereof extends in the first direction DR1 and a light source unit LSU which is provided in plurality mounted on the light source substrate SUB. The light source units LSU may be provided to be spaced apart from each other in the first direction DR1 with a uniform distance therebetween. The light source units LSU may be provided to face the side surface of the light guide plate 160 in the second direction DR2. The light source units LSU may be configured to generate and emit light, and the light emitted from the light source units LSU may be incident into the side surface (e.g., the light-incident surface) of the light guide plate 160.

The reflection sheet 170 may be configured to reflect a part of the light which propagates toward the lower surface of the light guide plate 160, toward the display panel 110 or in the upward direction.

The optical structure 150 may be configured to collimate and condense the light which is incident from the light guide plate 160, in the upward direction. The optical structure 150 may be configured to allow the light to propagate toward the display panel 110 or in the upward direction with uniform brightness distribution.

Hereinafter, the upward direction perpendicular to both of the first and second directions DR1 and DR2 will be referred to as a third direction DR3 or a normal direction. The optical structure 150 may have a sheet shape which is disposed in a plane which parallel to a plane defined by the first and second direction DR1 and DR2. When measured in the third direction DR3, the optical structure 150 may have a thickness ranging from about 3.5 micrometers (μm) to about 10 μm. The detailed structure of the optical structure 150 will be described in more detail with reference to FIGS. 3 and 4.

Figure 2:
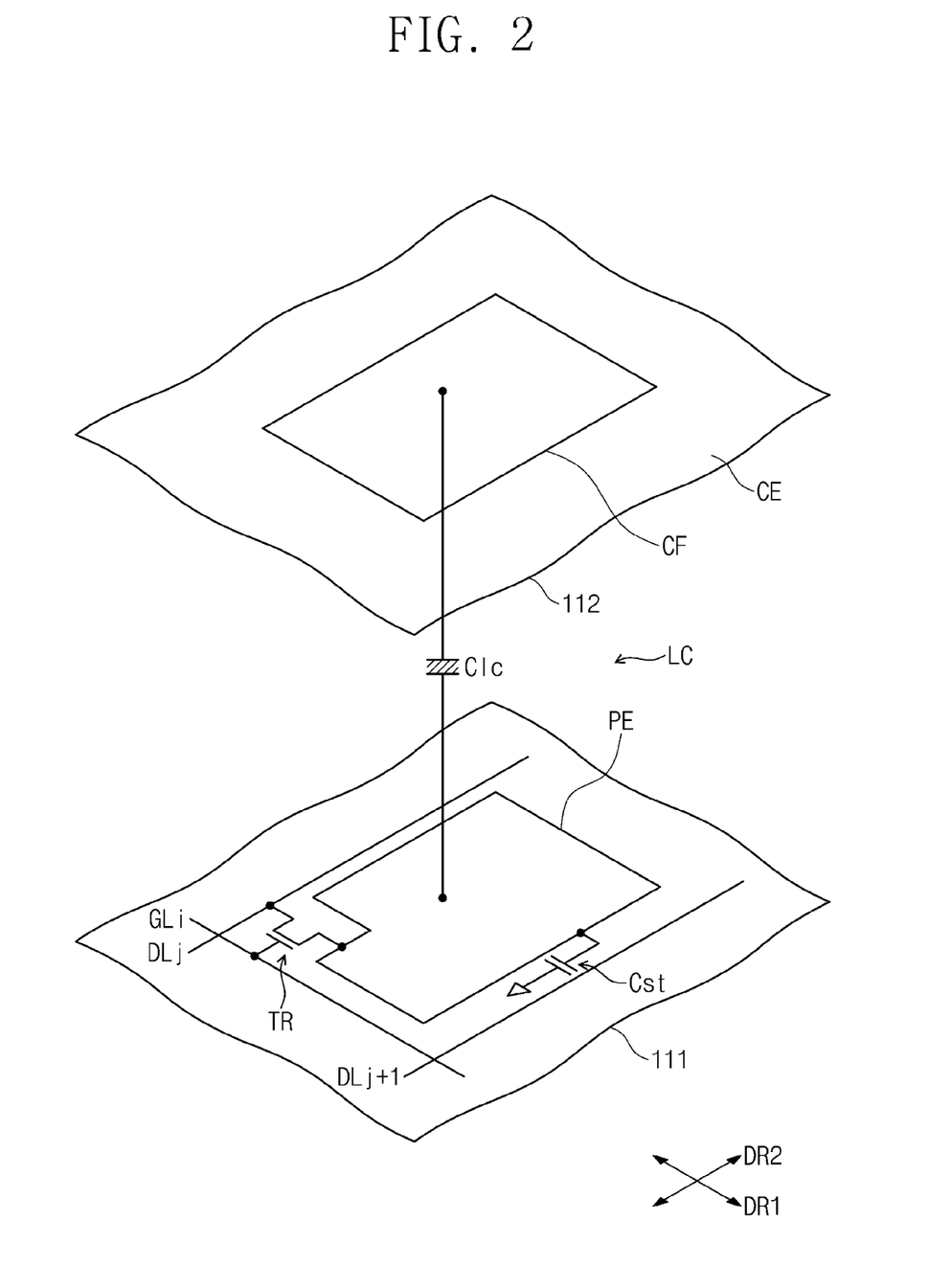
FIG. 2 is a diagram schematically illustrating an exemplary embodiment of a structure of a pixel in the display device of FIG. 1.

FIG. 2 is a diagram schematically illustrating an exemplary embodiment of a structure of a pixel in the display device of FIG. 1.

For convenience in description, FIG. 2 illustrates a pixel PX connected to the gate line GLi and the data line DLj among the gate and data lines GL1-GLm and DL1-DLn. A data line DLj+1 is disposed adjacent to the data line DLj in the first direction DR1. Although not shown, other pixels PX of the display panel 110 may be configured to have the same structure as that of the pixel PX shown in FIG. 2.

Referring to FIG. 2, the pixel PX may include a transistor TR connected to the gate line GLi and the data line DLj, a liquid crystal capacitor Clc connected to the transistor TR, and a storage capacitor Cst connected in parallel to the liquid crystal capacitor Clc, where 'i' and 'j' are natural numbers. In certain embodiments, the storage capacitor Cst may be omitted.

The transistor TR may be provided on the first substrate 111. The transistor TR may include a gate electrode connected to the gate line GLi, a source electrode connected to the data line DLj, and a drain electrode connected to the liquid crystal capacitor Clc and the storage capacitor Cst.

The liquid crystal capacitor Clc may include a pixel electrode PE provided on the first substrate 111, a common electrode CE provided on the second substrate 112, and the liquid crystal layer LC disposed between the pixel and common electrodes PE and CE. The liquid crystal layer LC may serve as a dielectric layer. The pixel electrode PE may be connected to the drain electrode of the transistor TR.

FIG. 2 illustrates an example in which the pixel electrode PE does not have a slit structure, but the invention is not limited thereto. As an example, the pixel electrode PE may be provided to have a slit structure (for example, including a cross-shaped stem portion and a plurality of branches which extends radially from the stem portion).

The common electrode CE may be provided on the second substrate 112, but the invention is limited thereto. In an alternative exemplary embodiment, for example, the common electrode CE may be provided on the first substrate 111 within the first display substrate. In this case, at least one of the pixel and common electrodes PE and CE may be configured to include a slit-shaped pattern.

The storage capacitor Cst may include the pixel electrode PE as a first terminal, a storage electrode (not shown) diverging from a storage line (not shown) as a second terminal, and an insulating layer disposed between the pixel electrode PE and the storage electrode. The storage line may be provided on the first substrate 111. In an exemplary embodiment of manufacturing a display device, the storage line and the gate lines GL1-GLm may be simultaneously formed such as to be in a same layer of the first display substrate among layers on the first substrate 111. The storage electrode may be partially overlapped with the pixel electrode PE in the top plan view.

The pixel PX may further include a color filter CF, which is configured to display one of red, green and blue colors. In exemplary embodiments, the color filter CF may be provided on the second substrate 112, as shown in FIG. 2, but the invention is not limited thereto. In an alternative exemplary embodiment, for example, the color filter CF may be provided on the first substrate 111 within the first display substrate.

The transistor TR may be turned on in response to a gate signal applied to the gate line GLi. If a data voltage is applied to the transistor TR via the data line DLj, the data voltage may be applied to the pixel electrode PE of the liquid crystal capacitor Clc via the turned-on transistor TR. In some embodiments, a common voltage may be applied to the common electrode CE.

Due to a difference in voltage level between the data voltage and the common voltage, an electric field may be applied between the pixel and common electrodes PE and CE. The electric field applied between the pixel and common electrodes PE and CE may be used to control motion or orientation of liquid crystal molecules of the liquid crystal layer LC. The change in motion or orientation of the liquid crystal molecules may be controlled to adjust optical transmittance of the liquid crystal layer LC, and this may be used to display an image.

A storage voltage of a constant level may be applied to the storage line, but the invention is limited thereto. In an exemplary embodiment, for example, the common voltage may be applied to the storage line. The storage capacitor Cst may be configured to compensate electric charges (e.g., voltage) stored in the liquid crystal capacitor Clc.

Figure 3:
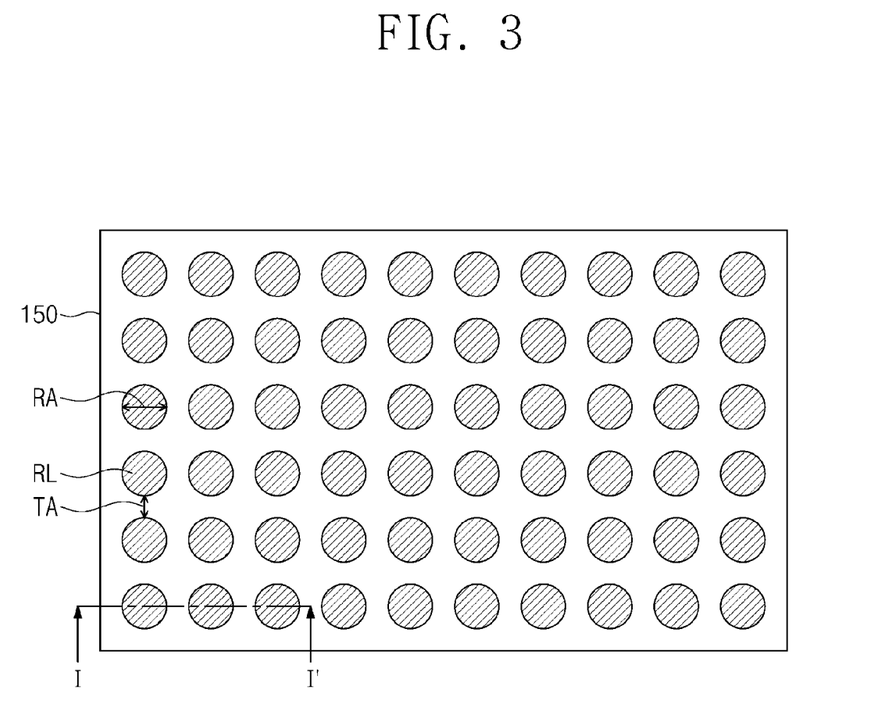
FIG. 3 is a top plan view of an exemplary embodiment of an optical structure of the backlight unit of FIG. 1.
Figure 4:
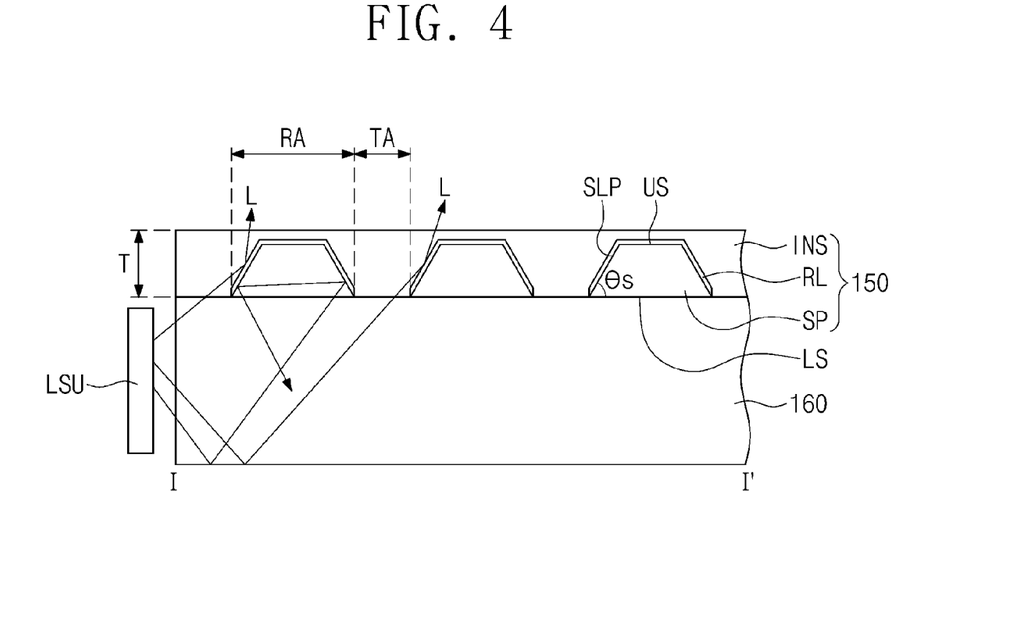
FIG. 4 is a cross-sectional view of the optical structure of the backlight unit taken along line I-I' of FIG. 3.
Figure 5:
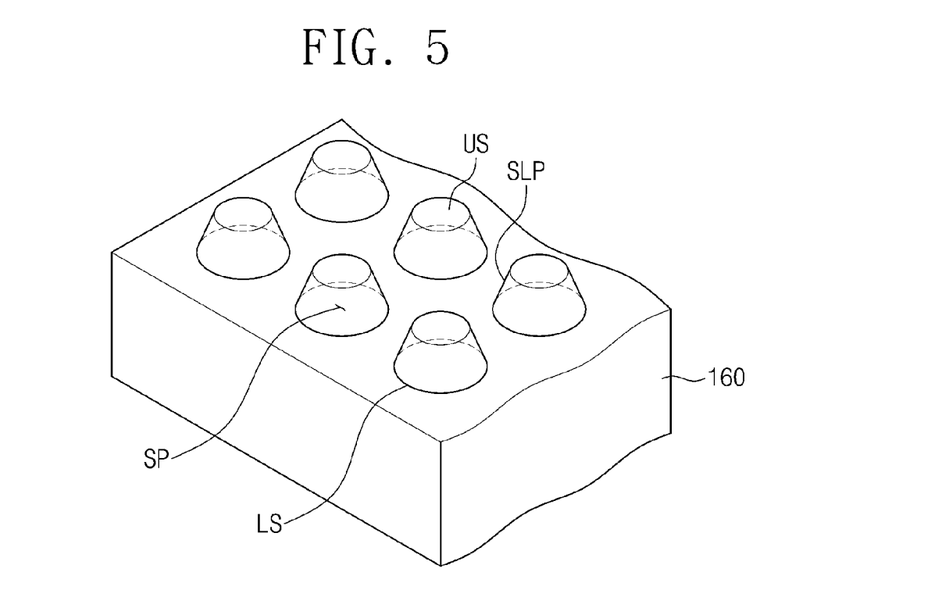
FIG. 5 is a perspective view illustrating an exemplary embodiment of supporting patterns of the optical structure of FIG. 4.

FIG. 3 is a top plan view of an exemplary embodiment of an optical structure of the backlight unit of FIG. 1. FIG. 4 is a cross-sectional view of the optical structure of the backlight unit taken along line I-I' of FIG. 3. FIG. 5 is a perspective view illustrating an exemplary embodiment of supporting patterns of the optical structure of FIG. 4. For convenience of illustration, FIG. 5 omits an insulating layer and a reflective pattern shown in FIG. 4.

Referring to FIGS. 3, 4, and 5, the light guide plate 160 may include a reflection region RA provided in plurality and at least one transmission region TA which is provided to surround the reflection regions RA. The reflection and transmission regions RA and TA of the light guide plate 160 may define a whole planar area of the light guide plate 160 in the top plan view. As described above, the light guide plate 160 may guide incident light in the upward direction. Incident light may be reflected at the reflection regions RA of the light guide plate 160, and the incident light may pass through the light guide plate 160 at the transmission regions TA thereof. The reflection regions RA may be arranged in a matrix shape in the top plan view, but the invention is not limited thereto. In an exemplary embodiment, for example, the reflection regions RA of the light guide plate 160 may be arranged in various shapes or in an irregular manner.

The optical structure 150 may include a supporting pattern SP provided in plurality arranged on the light guide plate 160, a reflection layer RL provided in plurality respectively on the supporting patterns SP, and an insulating layer INS which is provided on the light guide plate 160 to cover the reflection layers RL.

The supporting patterns SP may be provided on the reflection regions RA of the light guide plate 160, as indicated by the hatched pattern in FIG. 3. The supporting patterns SP may be organic patterns which include or are formed of or include an organic material. Each of the supporting patterns SP may be provided to have a cylinder shape or may be shaped like a truncated cone having a decreasing diameter in the upward direction. In an exemplary embodiment, for example, when viewed in the first or second direction DR1 or DR2 (e.g., in cross-section), each of the supporting patterns SP may have a trapezoidal section shape.

Each of the supporting patterns SP may have or define a lower surface LS, an upper surface US, and a side surface SLP connecting the lower and upper surfaces LS and US to each other. Each of the lower and upper surfaces LS and US may have a circular shape in the top plan view, and the side surface SLP may be an inclined surface in cross-section that extends at an angle with respect to the upper surface of the light guide plate 160. The upper surface of the light guide plate 160 may be disposed in a plane which is parallel to a plane defined in the first and second directions DR1 and DR2.

The side surface SLP of each of the supporting patterns SP may be inclined at an angle θs of about 55 degrees (°) to about 80° relative to the upper surface of the light guide plate 160. In some embodiments, the angle θs may be about 70°.

The supporting patterns SP may be arranged in the first and second directions DR1 and DR2 or in a matrix shape in the top plan view, but the invention is not limited thereto. In an exemplary embodiment, for example, the supporting patterns SP may be arranged in various pattern shapes or in an irregular manner.

The reflection layers RL may be respectively provided on the upper and side surfaces US and SLP of the supporting patterns SP, as indicated by the hatched pattern in FIG. 3. That is, the supporting patterns SP and the reflection layers RL are discrete members disposed on the upper surface of the light guide plate 160 and spaced apart from each other. The upper surface of the light guide plate 160 is exposed between the discrete supporting patterns SP and reflection layers RL. The reflection layers RL may be formed of or include an optically reflective metallic material (e.g., aluminum). The reflection layers RL may be provided to conformally cover the upper and side surfaces US and SLP of the supporting patterns SP, such that the reflection layers RL have a shape or profile corresponding to the upper and side surfaces US and SLP of the supporting patterns SP. Thus, the side surface SLP and a portion of the reflection layer RL covering the same may be inclined at the same angle θs. The reflection layers RL may terminate at the upper surface of the light guide plate 160, but the invention is not limited thereto.

The insulating layer INS may be an organic insulating layer including an organic material. The insulating layer INS may be provided on the light guide plate 160 to cover the reflection layers RL and the upper surface of the light guide plate 160, and may have a flat top surface. Due to the flat top surface thereof, the insulating layer INS may serve as a planarization layer for reducing spatial variation in surface levels of the resulting structure with the supporting patterns SP. The insulating layer INS may have the same refractive index as that of the light guide plate 160. The insulating layer INS, the supporting patterns SP and the light guide plate 160 may have the same refractive index as each other. But the invention is not limited thereto, and for example, the insulating layer INS and the light guide plate 160 may have a refractive index different from that of the supporting patterns SP.

The lower surfaces LS of the supporting patterns SP and the lower surface of the insulating layer INS may collectively form or define a lower surface of the overall optical structure 150 having the sheet shape. The top surface of the insulating layer INS may form or define a top surface of the overall optical structure 150 having the sheet shape. The reflection region RA and the transmission region TA of the light guide plate 160 may be defined at or by portions of the upper (light-exiting) surface of the light guide plate 160 located with respect to the supporting patterns SP.

A total thickness T of the optical structure 150 may be defined as a distance between the lower surface LS of each of the supporting patterns SP (or the upper surface of the light guide plate 160) and the top surface of the insulating layer INS. The thickness T may be a maximum distance between the lower surface LS of each of the supporting patterns SP (or a lower surface of the insulating layer INS) and the top surface of the insulating layer INS. The thickness T of the optical structure 150 may range from about 3.5 µm to about 10 µm.

The light L emitted from the light source units LSU may be incident into the light guide plate 160 through the side surface of the light guide plate 160, and in the light guide plate 160 the incident light may be guided in the upward direction. In the case where the light guide plate 160 has substantially the same refractive index as that of the insulating layer INS, the light L which is incident to the transmission region TA of the light guide plate 160, may pass through the insulating layer INS.

Since the side surfaces SLP of the supporting patterns SP and the reflection layers RL thereon are inclined at the angle of about 55° to about 80° relative to the upper surface of the light guide plate 160, the incident light L propagating toward the reflection layers RL from within the insulating layer INS may be reflected upward by the reflection layers RL.

The incident light L, which is guided by the light guide plate 160 and propagates toward the reflection regions RA from within the light guide plate 160, may be reflected by the reflection layers RL which are provided on the upper and side surfaces US and SLP of the supporting patterns SP and thereby may be incident again to the light guide plate 160. The light L, which is reflected by the reflection layers RL and is incident into the light guide plate 160, may be re-guided by the light guide plate 160 and may re-propagate toward the transmission region TA, or in certain embodiments, may be reflected by the reflection sheet 170 located below the light guide plate 160 and may be re-incident to the light guide plate 160 through the rear surface thereof. The light reflected by the reflection sheet 170 may propagate toward the transmission region TA to exit the light guide plate 160 through the light-exiting surface thereof That is, the optical structure 150 may be used to transmit the light L which is incident thereto through the light-exiting surface of the light guide plate 160, toward the display panel 110 or in the upward direction in a collimated and condensed manner. The light L emitted from optical structure 150 through the top surface thereof may propagate toward the display panel 110 or in the upward direction with uniform brightness distribution.

In a conventional optical sheet as a collection of individual sheets (i.e., a diffusion sheet, a prism sheet and a protection sheet), reducing a thickness of such conventional optical sheet is difficult owing to a relatively large total thickness of about 0.5 mm of the conventional optical sheet.

However, in one or more exemplary embodiment of the optical structure 150 according to some embodiments of the invention different from the convention optical sheet, the reflection layers RL provided on the supporting patterns SP may be used to collimate and condense the light L which is incident from the light guide plate 160. Additionally, in one or more exemplary embodiment, the optical structure 150 may be provided to have a total thickness of about 3.5 µm to about 10 µm. That is, the optical structure 150 may collimate and condense the light L, similar to the conventional thicker optical sheet, but may have a thickness relatively smaller than that of the conventional optical sheet. Thus, in the case where one or more exemplary embodiment of the optical structure 150 is used, optical loss which may occur when a relatively thick optical sheet is used may be reduced. Moreover, in the case where one or more exemplary embodiment of the optical structure 150 is used within a display device, an overall thickness of the display device is reduced when compared with the case that the conventional optical sheet is used.

According to some embodiments of the invention, since the optical structure 150 with improved light-emitting efficiency and a relatively slim structure is provided in the display device 100 (refer to FIG. 1), an overall thickness of the display device 100 may be advantageously reduced.

FIGS. 6 to 11 are cross-sectional views illustrating an exemplary embodiment of a method of fabricating an optical structure of a display device, according to the invention.

For convenience in description, the description of FIGS. 6 to 11 are given with reference to cross-sectional views taken along line I-I' of FIG. 4.

Figure 6:
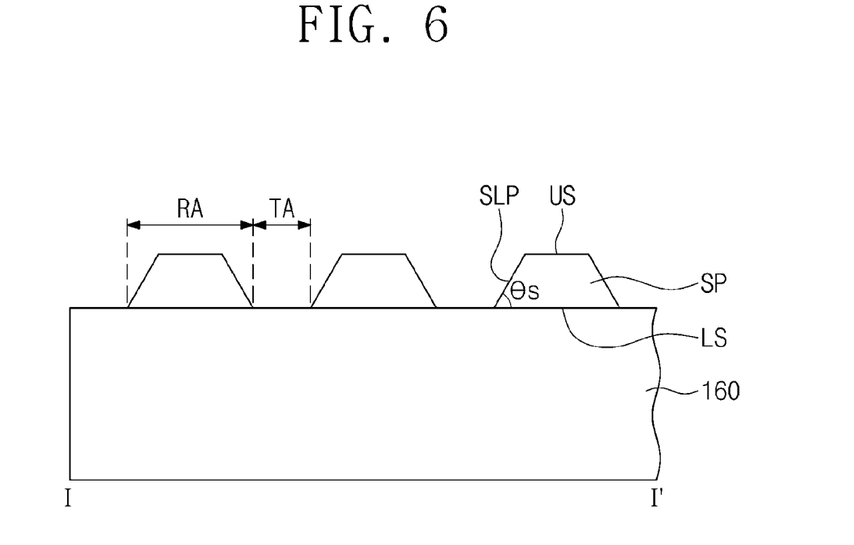
FIGS. 6 to 11 are sectional views illustrating an exemplary embodiment of a method of fabricating an optical structure of a display device, according to the invention.

Referring to FIG. 6, a light guide plate 160 may be prepared. The light guide plate 160 may include a reflection region RA provided in plurality and a transmission region TA surrounding the reflection regions RA. The reflection and transmission regions RA and TA may be portions of the light-exiting surface of the light guide plate 160, and may collectively define a whole of the light-exiting surface of the light guide plate 160. A supporting pattern SP may be provided in plurality respectively on the reflection regions RA of the light guide plate 160. The supporting patterns SP may divide the light guide plate 160 into the reflection and transmission regions RA and TA, but the invention is not limited thereto. The supporting patterns SP may be disposed to contact the light exit surface of the light guide plate 160.

As described above, each of the supporting patterns SP may be provided to have a cylinder shape or may be shaped like a truncated cone having a decreasing diameter in the upward direction. A vertical section of each of the supporting patterns SP may be shaped like a trapezoid. A side surface SLP of each of the supporting patterns SP may be inclined at an angle θs of about 55° to about 80° relative to an upper surface of the light guide plate 160.

Figure 7:
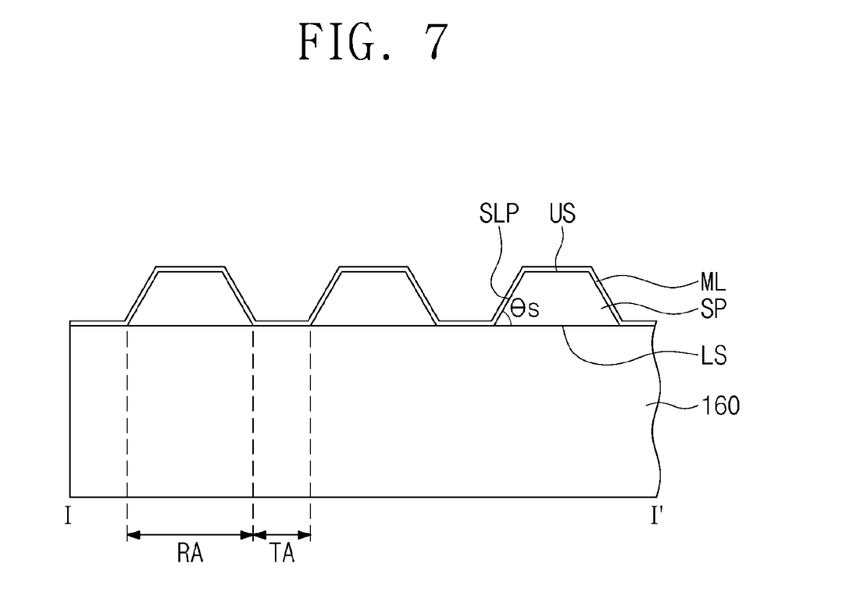

Referring to FIG. 7, a metal material layer ML may be formed on the light guide plate 160 including the supporting patterns SP thereon to cover the supporting patterns SP. The metal material layer ML may be formed on the upper and side surfaces US and SLP of each of the supporting patterns SP and on the transmission region TA of the upper surface of the light guide plate 160. The metal material layer ML may be formed of an optically reflective material. That is, the metal material layer ML may be formed on a whole of the light guide plate 160.

Figure 8:
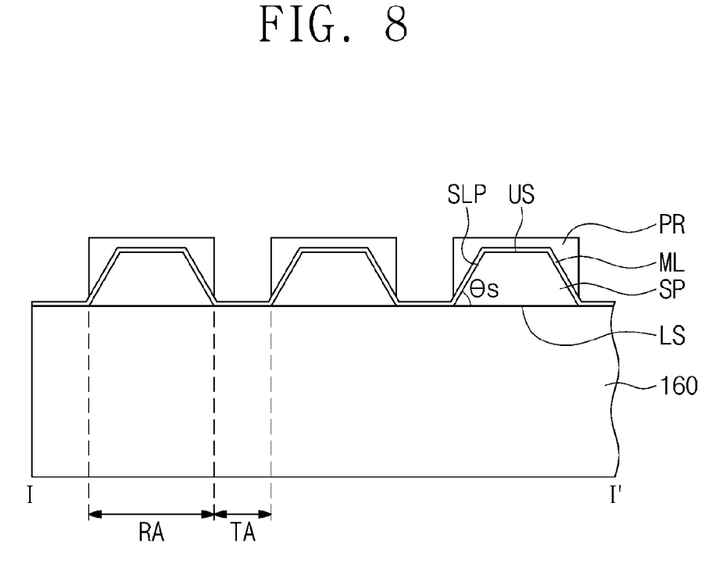

Referring to FIG. 8, a photoresist pattern PR may be formed in plurality respectively on the reflection regions RA and on the metal material layer ML corresponding thereto. Although not shown, the formation of the photoresist patterns PR may include forming a photoresist material layer or a photosensitive resin on the metal material layer ML and performing a photolithography process to remove a portion of the photoresist material layer from the transmission region TA of the light guide plate 160.

Figure 9:
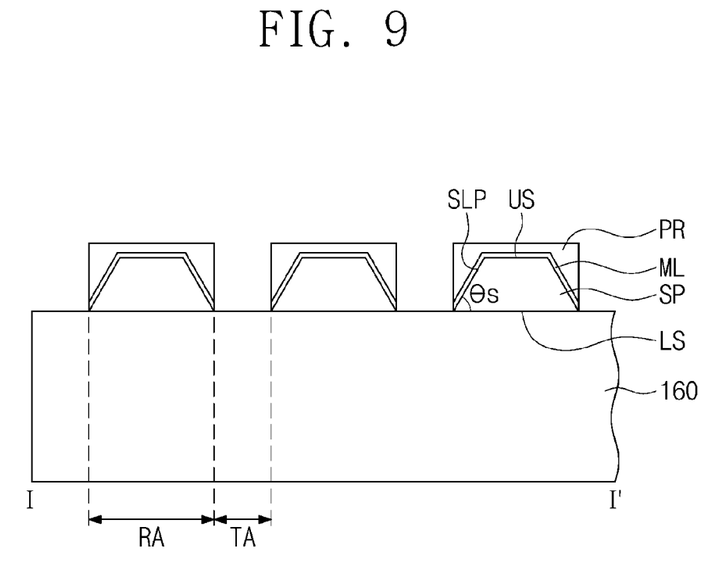

Referring to FIG. 9, an etching process using the photoresist patterns PR as an etch mask may be performed to remove a portion of the metal material layer ML at the transmission region TA of the light guide plate 160. As a result, portions of the metal material layer ML may respectively remain on the supporting patterns SP at the reflection regions RA.

Figure 10:
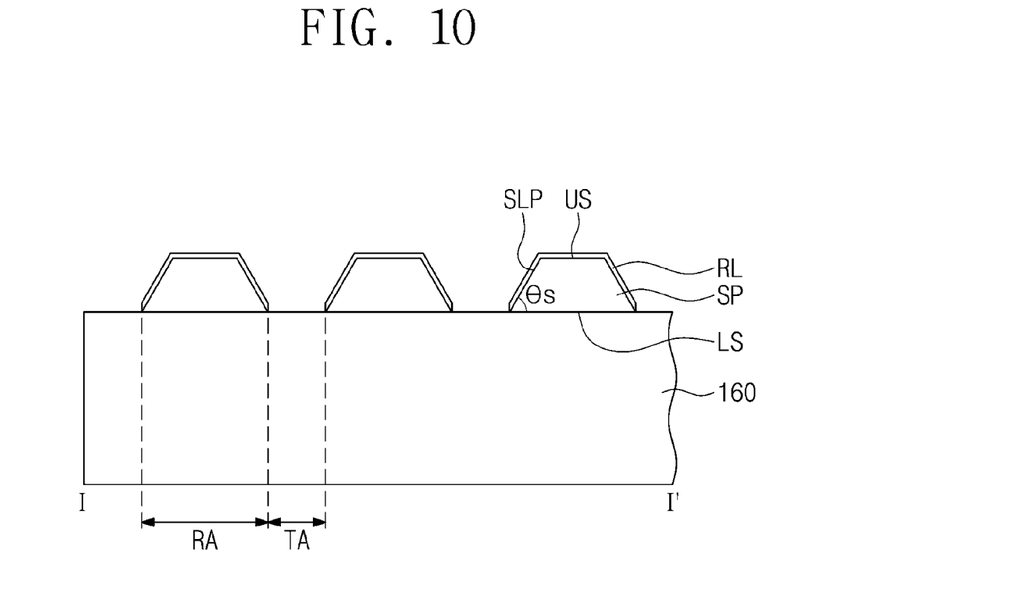

Referring to FIG. 10, the photoresist patterns PR may be removed. In this case, the portions of the metal material layer ML remaining on the supporting patterns SP at the reflection regions RA may for the reflection layers RL.

Figure 11:
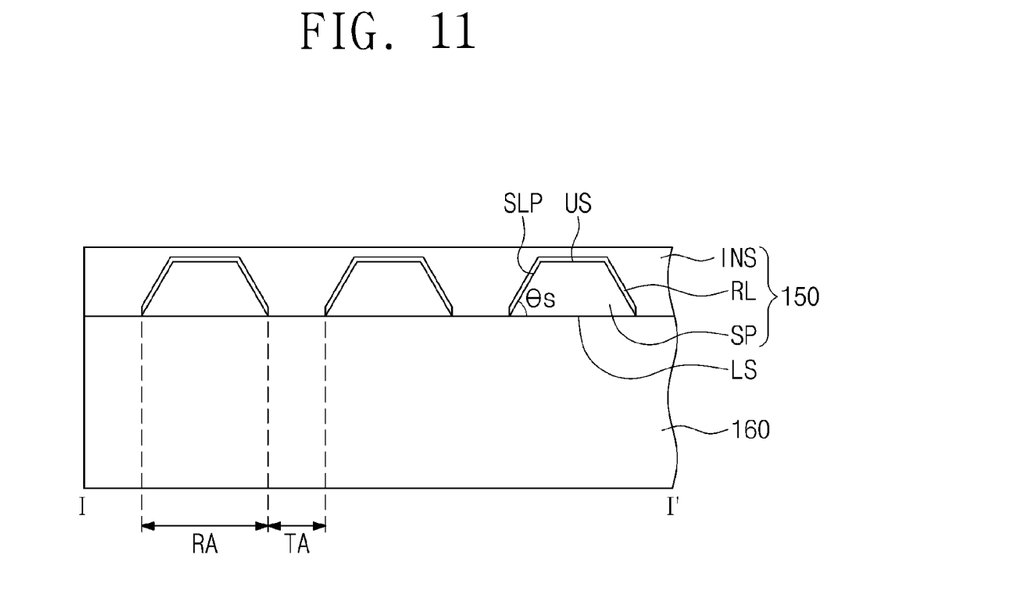
Figure 12:
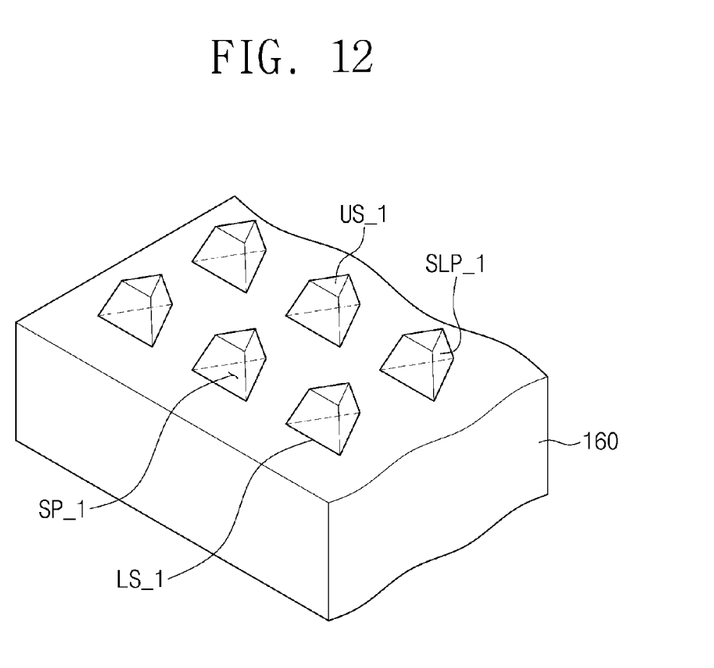
FIGS. 12 to 15 are perspective views respectively illustrating modified exemplary embodiments of supporting patterns of an optical structure of a display device, according to the invention.
Figure 13:
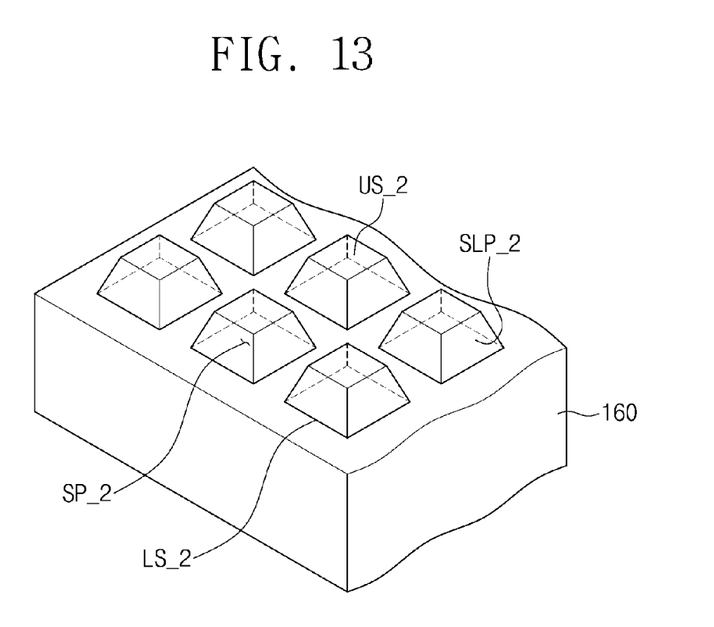
Figure 14:
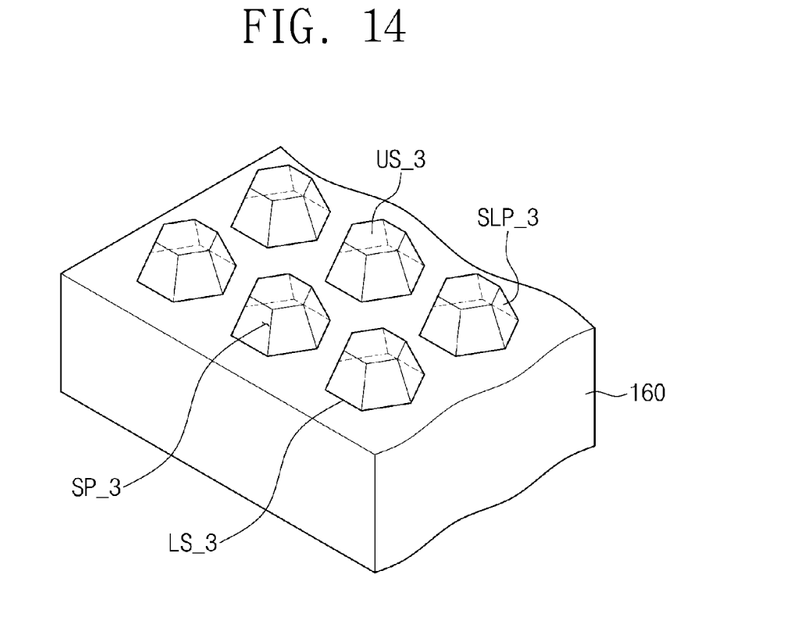
Figure 15:
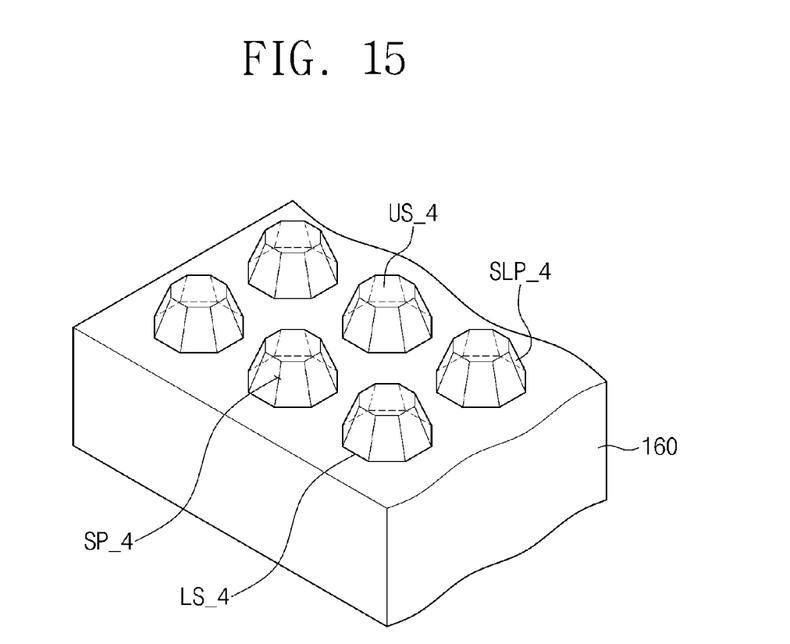

Referring to FIG. 11, an insulating layer INS may be formed on the light guide plate 160 including the supporting patterns SP and the reflection layers RL thereon to cover the reflection layers RL and the light guide plate 160. That is, the insulating layer INS may be formed on a whole of the light guide plate 160. The resulting structure may have substantially the same as one or more exemplary embodiment of the optical structure 150 of the display device 100 described above. The insulating layer INS may be disposed to contact the light exit surface of the light guide plate 160. That is, with the supporting pattern SP and the insulating layer INS in contact with the light exit surface of the light guide plate 160, the optical structure 150 is integrated with the underlying light guide plate 160.

FIGS. 12 to 15 are perspective views respectively illustrating modified exemplary embodiments of shapes of supporting patterns of an optical structure of a display device, according to the invention. Like FIG. 5, for convenience of illustration, FIGS. 12 to 15 omits an insulating layer and a reflective pattern shown in FIG. 4.

The supporting patterns of the optical structure 150 may have various shapes and structures, as respectively depicted by the reference numbers SP_1, SP_2, SP_3 and SP_4 of FIGS. 12 to 15. In the top plan view (e.g., thickness direction, or DR3 normal to the plane defined by first and second directions DR1 and DR2), the supporting pattern may have a non-circular shape. Furthermore, as shown in FIGS. 12 to 15, upper surfaces US_1, US_2, US_3 and US_4 and lower surfaces LS_1, LS_2, LS_3 and LS_4 of the supporting patterns SP_1, SP_2, SP_3 and SP_4 may have various polygonal shapes (e.g., triangular (FIG. 12), tetragonal (FIG. 13), hexagonal (FIG. 14) and octagonal (FIG. 15) shapes).

In addition, similar to the supporting patterns SP of FIG. 5, each of the supporting patterns SP_1, SP_2, SP_3 and SP_4 may be a polygonal pillar structure whose width decreases in the upward direction. The width may be taken in a plane parallel to that defined by the first and second direction DR1 and DR2. In this case, a side surface SLP_1, SLP_2, SLP_3 and SLP_4 of the supporting patterns SP_1, SP_2, SP_3 and SP_4 is provided in plurality each of which may be inclined at an angle with respect to the upper surface of the light guide plate 160. Similar to that described above, the side surfaces SLP_1, SLP_2, SLP_3 and SLP_4 of the supporting patterns SP_1, SP_2, SP_3 and SP_4 may be inclined at an angle θs of about 55 degrees (°) to about 80° relative to the upper surface of the light guide plate 160. In some embodiments, the angle θs may be about 70°.

Figure 16:
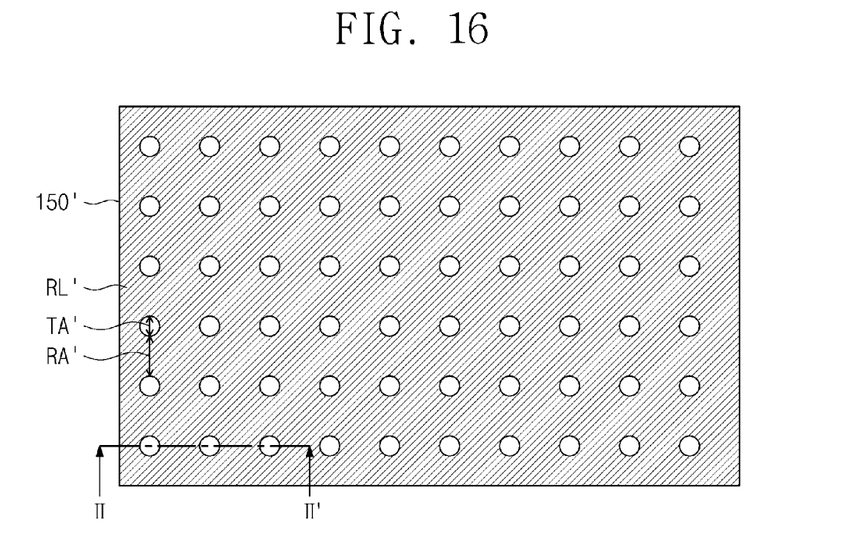
FIGS. 16 and 17 are respectively a top plan view and a cross-sectional view of another exemplary embodiment of an optical structure of a backlight unit of a display device according to the invention.
Figure 17:
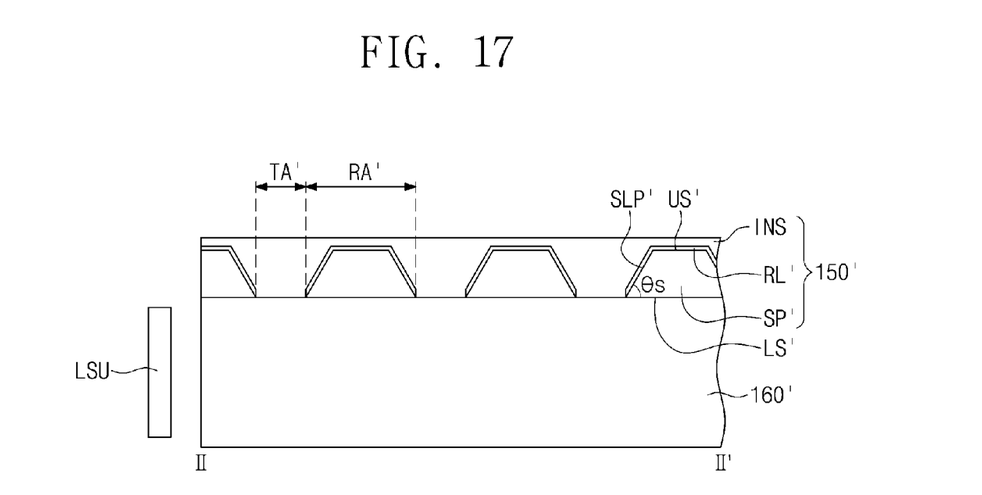

FIGS. 16 and 17 are views of another exemplary embodiment of an optical structure of a backlight unit of a display device according to the invention.

In detail, FIG. 16 is a top plan view of the optical structure 150' and FIG. 17 is a cross-sectional view taken along line II-II' of FIG. 16.

Referring to FIGS. 16 and 17, a light guide plate 160' may include a transmission region TA' provided in plurality and a reflection region RA', which is provided around the transmission regions TA'. Unlike the previous embodiments of FIG. 3, the light guide plate 160' may include the plurality of transmission regions TA'. The optical structure 150' may include a supporting pattern SP', a reflection layer RL' which is on the supporting pattern SP', and an insulating layer INS.

The supporting pattern SP' may be formed of or include an organic material and may be provided at the reflection region RA' of the light guide plate 160', as indicated by the hatched pattern in FIG. 16. The supporting pattern SP' may include a lower surface LS', an upper surface US' and a side surface SLP' provided in plurality connecting the lower and upper surfaces LS' and US' to each other. Here, the side surfaces SLP' may be inclined at an angle to an upper surface of the light guide plate 160'. In an exemplary embodiment, for example, the side surfaces SLP' of the supporting pattern SP' may be inclined at an angle θs of about 55° to about 80° relative to the upper surface of the light guide plate 160'.

The reflection layer RL' may be provided on the upper and side surfaces US' and SLP' of the supporting pattern SP'. The reflection layer RL' may be disposed or formed to cover the upper and side surfaces US' and SLP' of the supporting pattern SP' with a uniform thickness, and thus, the reflection layer RL' provided on the side surfaces SLP' of the supporting pattern SP' may also be inclined at the same angle as that of the side surfaces SLP' of the supporting pattern SP'. The thickness of the reflection layer RL' is taken a direction normal to the surface of the supporting pattern SP' on which it is disposed. The insulating layer INS, which is provided on the light guide plate 160' to cover the reflection layer RL', may be an organic insulating layer, which have the same refractive index as that of the light guide plate 160.

In other words, the supporting pattern SP' and the reflection layer RL' may be provided at the reflection region RA' around the plurality of transmission regions TA', unlike the optical structure 150 of FIGS. 3 and 4. That is, the supporting pattern SP' and the reflection layer RL' in FIGS. 16 and 17 are each a single, unitary member across the upper surface of the light guide plate 160', unlike the discrete supporting and reflection members of the optical structure 150 of FIGS. 3 and 4. Instead, the transmission regions TA' are discrete regions of the light guide plate 160 and spaced apart from each other by the side surfaces of the supporting patterns SP'. The upper surface of the light guide plate 160' is exposed between the side surfaces of the supporting patterns SP'. Portions of the unitary supporting pattern SP' and reflection layer RL' are spaced apart from each other at the transmission regions TA' to expose the light exit surface of the light guide plate 160 therebetween. The upper surface of the light guide plate 160' is exposed between portions of the unitary supporting pattern SP' and reflection layer RL'. Except for this difference, the optical structure 150' may be configured to have substantially the same features as those of the optical structure 150.

Thus, referring to FIGS. 4 and 17, light which is transmitted at the transmission regions TA' to the reflection layer RL' from within the insulating layer INS, may be reflected upward by the reflection layer RL'. Also, light, which is transmitted from within the light guide plate 160' to the reflection region RA', may be reflected by the reflection layer RL' and may be re-incident into the light guide plate 160'. As a result, when light is transmitted from the light guide plate 160' toward the display panel (110 in FIG. 1) or in the upward direction, the light may be collimated and condensed by the optical structure 150'.

One or more exemplary embodiment of the optical structure 150' may be used to collimate and condense the light L (FIG. 4), similar to a conventional optical sheet. Moreover, one or more exemplary embodiment of the optical structure 150' may have a total thickness smaller than that of the conventional optical sheet. Thus, in the case where one or more exemplary embodiment of the optical structure 150' is used, optical loss which may occur when a relatively thick optical sheet is used may be reduced. Moreover, in the case where one or more exemplary embodiment of the optical structure 150' is used within a display device, an overall thickness of the display device is reduced when compared with the case that the conventional optical sheet is used.

According to one or more exemplary embodiment of the invention, a display device may include an optical structure which is configured to collimate and condense light in an upward direction, instead of a conventional collection of individual optical sheets. Thus, it is possible to improve light-emitting efficiency of the display device. Furthermore, since the optical structure has a relatively slim structure as compared to the conventional optical sheet, an overall thickness of the display device may be advantageously reduced.

While exemplary embodiments of the invention have been particularly shown and described, it will be understood by one of ordinary skill in the art that variations in form and detail may be made therein without departing from the spirit and scope of the attached claims.

What is claimed is:

1. A display device, comprising:
    a display panel configured to display an image using light; and
    a backlight unit configured to provide the light to the display panel,
    wherein
    the backlight unit comprises:
        a light source which generates the light;
        a light guide plate which guides the light in an upward direction toward the display panel and the light guide plate including a transmission region and a reflection region;
        a supporting pattern on a light exit surface of the light guide plate at the reflection region thereof, the supporting pattern comprising an upper surface facing the display panel, a lower surface facing the light exit surface of the light guide plate, and a side surface which connects the upper and lower surfaces to each other;
        a reflection layer provided on the upper and side surfaces of the supporting pattern at the reflection region of the light guide plate; and
        an insulating layer which covers the transmission region of the light guide plate and the reflection layer at the reflection region of the light guide plate.

2. The display device of claim 1, wherein the supporting pattern and the insulating layer comprise an organic material.

3. The display device of claim 1, wherein the reflection layer comprises a metallic material configured to reflect the light.

4. The display device of claim 1, wherein the insulating layer has a refractive index equal to that of the light guide plate.

5. The display device of claim 1, wherein the insulating layer, the light guide plate and the supporting pattern have the same refractive index.

6. The display device of claim 1, wherein the supporting pattern is provided as a plurality of discrete supporting patterns spaced apart from each other on the light exit surface of the light guide plate, such plurality of discrete supporting patterns defining a plurality of discrete reflection regions of the light guide plate which are spaced apart from each other in a top plan view.

7. The display device of claim 1, wherein the supporting pattern is provided as a unitary supporting pattern including a plurality of side surfaces thereof spaced apart from each other, such side surfaces defining a plurality of discrete transmission regions of the light guide plate which are spaced apart from each other in a top plan view.

8. The display device of claim 1, wherein
    the supporting pattern has a cylindrical shape,
    a diameter of the cylindrical shape supporting pattern decreases in a direction from the lower surface to the upper surface thereof, and
    a cross section of the cylindrical shape supporting pattern has a trapezoidal shape.

9. The display device of claim 1, wherein the side surface of the supporting pattern and the reflection layer thereon are inclined at an angle of about 55 degrees to about 80 degrees relative to the light exit surface of the light guide plate.

10. The display device of claim 9, wherein the side surface of the supporting pattern and the reflection layer thereon are inclined at an angle of about 70 degrees relative to the light exit surface of the light guide plate.

11. The display device of claim 1, wherein
    a distance between the lower surface of the supporting pattern and an upper surface of the insulating layer ranges from about 3.5 micrometers to about 10 micrometers.

12. The display device of claim 1, wherein the supporting pattern has a polygonal pillar structure for which a width thereof decreases in the upward direction toward the display panel.

13. A method of fabricating a display device, comprising:
    preparing a light guide plate which guides the light in the upward direction toward a display panel and the light guide plate including a transmission region and a reflection region;
    forming a supporting pattern on a light exit surface of the light guide plate at the reflection region thereof, the supporting pattern comprising an upper surface facing the display panel, a lower surface facing the light exit surface of the light guide plate, and a side surface which connects the upper and lower surfaces to each other;
    forming a metal material layer on the supporting pattern at the reflection region and on the light exit surface of the light guide plate at the transmission region thereof;
    etching the metal material layer to remove a portion of the metal material layer at the transmission region and to maintain a portion of the metal material layer on the upper and side surfaces of the supporting pattern at the reflection region, the portion of the metal material layer maintained on the upper and side surfaces forming a reflection layer on the supporting pattern; and forming an insulating layer on the light guide plate to cover the light transmission region of the light guide plate and to cover the reflection layer at the reflection region of the light guide plate.

14. The method of claim 13, wherein the supporting pattern and the insulating layer comprise an organic material.

15. The method of claim 13, wherein the insulating layer has a refractive index equal to that of the light guide plate.

16. The method of claim 13, wherein the supporting pattern is provided in plurality arranged spaced apart from each other in a matrix shape on the light exit surface of the light guide plate.

17. The method of claim 13, wherein
the supporting pattern has a cylindrical shape,
a diameter of the cylindrical shape supporting pattern decreases in a direction from the lower surface to the upper surface thereof, and
a cross section of the cylindrical shape supporting pattern has a trapezoidal shape.

18. The method of claim 13, wherein the side surface of the supporting pattern and the reflection layer thereon are inclined at an angle of about 55 degrees to about 80 degrees relative to the light exit surface of the light guide plate.

19. The method of claim 13, wherein
a distance between the lower surface of the supporting pattern and an upper surface of the insulating layer ranges from about 3.5 micrometers to about 10 micrometers.

20. A backlight unit, comprising:
a light guide plate which guides light in an upward direction toward a display panel of the display device; and
an optical structure through which the light emitted from the light guide plate is transmitted to the display panel in the upward direction,
wherein
the light guide plate comprises:
 a transmission region at which the optical structure transmits the light emitted through the light exit surface to the display panel, and
 a reflection region at which the optical structure reflects the light emitted through the light exit surface to the light guide plate, and the optical structure comprises:
 a supporting pattern in contact with the light exit surface of the light guide plate at the reflection region thereof, the supporting pattern comprising an upper surface facing the display panel, a lower surface contacting the light exit surface of the light guide plate, and a side surface which connects the upper and lower surfaces to each other;
 a reflection layer provided on the upper and side surfaces of the supporting pattern at the reflection region of the light guide plate; and
 an insulating layer which covers the reflection layer at the reflection region of the light guide plate, such insulating layer in contact with the light exit surface of the light guide plate at the transmission region thereof.

* * * * *